INVENTOR
Daniel J. Kaufman

June 13, 1967     D. J. KAUFMAN     3,324,868
CAR WASH INSTALLATION
Filed June 10, 1965                         2 Sheets-Sheet 2
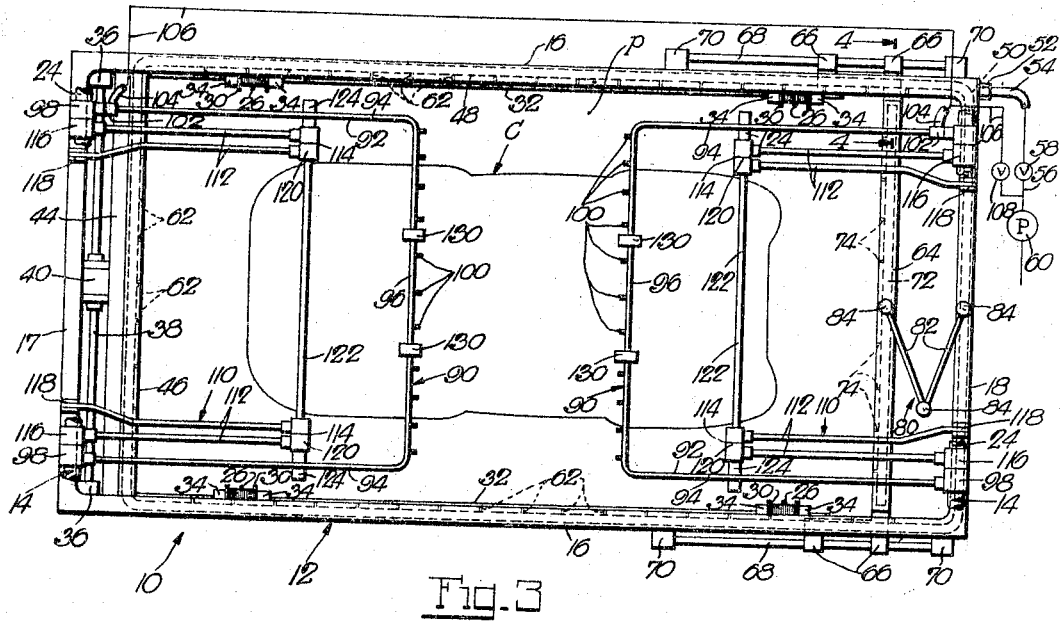
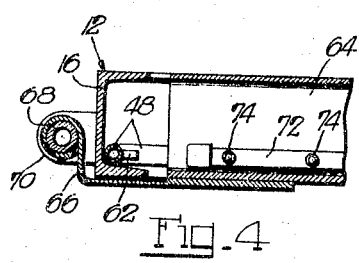
INVENTOR
Daniel J. Kaufman
BY
Attorney United States Patent Office 3,324,868
Patented June 13, 1967

3,324,868
CAR WASH INSTALLATION
Daniel J. Kaufman, Bridgeport, Conn., assignor to The Choldun Manufacturing Corporation, New Haven, Conn., a corporation of Connecticut
Filed June 10, 1965, Ser. No. 462,941
8 Claims. (Cl. 134—123)

ABSTRACT OF THE DISCLOSURE

The disclosure deals with a car wash installation having a first vertically movable frame for spraying a car sideways all around, two top-hinged frames for spraying the same car from above in rough approximation of the front and rear contour of the car, and an operating connection between the first frame and hinged frames whereby the latter are swung downwardly and upwardly on downward and upward movement, respectively, of the first frame, with the first frame being suspended from an overhead support and operated by overhead power means so that in the up positions of the frames the floor space therebeneath is clear to a level above a car on the floor.

---

The type of car wash installation with which the present invention is concerned provides a generally rectangular spray frame which is horizontally disposed and suspended from a ceiling or other overhead support for up and down movement relative to a car which has been driven underneath the raised frame for washing, with the frame being provided with a multiplicity of inwardly directed nozzles all around through which to discharge jets of water and other cleaning liquid in proper order against the car. While these wash installations perform satisfactorily in general, they have a few though important, shortcomings. Thus, while the generally more horizontally directed liquid jets from the frame reach and impinge on the nearby and more upright surfaces of a car with good cleaning and rinsing effect, they reach and impinge on the other, more distant and reclining, car surfaces, such as the top and hood, for example, with less cleaning and rinsing effect. It thus happens that these more distant car surfaces do not always emerge as clean as the rest of the car unless they receive extra towelling at the expense of added manpower and, hence, profit to the commercial establishment. Also, with the increasing number of cars of widely different sizes, and especially smaller sizes, a car wash installation of standard size for accommodating and fairly thoroughly washing larger cars and also trucks becomes progressively less effective for cars of increasingly small sizes owing to rapid pressure drop of the liquid jets away from the washer frame. On the other hand, most commercial car wash establishments would not go to the expense of even two different-size installations for larger and smaller cars, respectively, and even if such different-size installations were available in a particular establishment they would not be entirely satisfactory for a large number of cars of inbetween sizes.

It is an object of the present invention to provide a car wash installation of this type which is of universal application for cars of all sizes and even trucks, yet washes all vehicles at least as clean as do prior installations of this type wash vehicles at their very best.

It is another object of the present invention to provide a car wash installation of the aforementioned universal application for vehicles of all sizes, which in addition to the usual up and down moving spray frame with its inwardly directed nozzles for liquid jets, i.e., the "main" spray frame, has overhead nozzles for discharging still further liquid jets downwardly upon a vehicle, thereby assuring the delivery of liquid to a vehicle of any size in adequate amounts and of sufficient force to wash all parts of the vehicle with equal thoroughness.

It is a further object of the present invention to provide a car wash installation of this type of which the aforementioned overhead nozzles are provided on an auxiliary frame which is so operatively connected with the main spray frame as to be brought by the latter on its operational up and down movements upwardly from and downwardly into operative positions in which liquid jets from its nozzles will have equal optimum washing effect on any vehicle therebeneath regardless of its size. Thus, the combined liquid jets from the nozzles on the main and auxiliary frames will reach all parts of a vehicle of any size with adequate overall force to do even a more thorough wash job than prior installations of this type, yet in view of the considerably increased volumetric flow rate of the discharged liquid on and its quicker distribution over the vehicle the operational up and down movements of the elevator frame may be accelerated to shorten the liquid discharge cycles to the point where the overall liquid consumption per car wash does not appreciably, if at all, exceed the liquid consumption per car wash of the prior installations of this type.

Another object of the present invention is to provide a car wash installation of this type of which the aforementioned auxiliary frame is divided into two separate sections which above the opposite ends of the main frame are hinged on the latter's overhead support for swinging movement from raised disposition within the confines of the raised main frame downwardly in opposite arcs which together sweep past the entire vertical contour from front to rear of most vehicles sufficiently close thereto regardless of vehicle size to have the liquid jets therefrom impinge with optimum washing effect on the vehicle throughout from above, with each of these frame sections resting on the main frame so as normally to follow the same in its operational up and down movement in swing fashion, and to come to rest with suitable non-scratch pads on a part of a vehicle which it does not clear on its downswing, such as the top of a station-wagon or truck, for example. In thus arranging the auxiliary frame in separate swing sections, the liquid jets therefrom are particularly conducive to optimum washing not only because of their overhead sweeping motion over a vehicle but also because they reach with substantial force every confronting part of a vehicle and distribute thereover and even over the sides thereof regardless of the size of the vehicle. The present car wash installation is thus particularly effective in achieving car washes of optimum thoroughness regardless of car size, owing to the considerable and lively cross-streaming of liquid on the car surfaces ensuing from the differently directed and differently traveling liquid jets from the main frame and from the swing sections of the auxiliary frame.

A further object of the present invention is to provide a car wash installation of this type of which the nozzles on at least one end of the main frame are adjustable inwardly of the latter so that the liquid jets therefrom may reach effectively cars which are too short to be reached at all effectively by liquid jets from the nozzles at both frame ends in the absence of such nozzle adjustability. Nozzle adjustability in this respect is, of course, advantageous in an installation of this type even without an auxiliary overhead frame with additional nozzles, but such nozzle adjustability in the main frame is of even greater advantage in conjunction with an auxiliary overhead frame with additional nozzles for achieving the ultimate in thoroughness of the washing operation.

Further objects and advantages will appear to those skilled in the art from the following, considered in conjunction with the accompanying drawings.

In the accompanying drawings, in which certain modes of carrying out the present invention are shown for illustrative purposes:

FIG. 3 is a section taken substantially on the line 3—3 of FIG. 1 and showing the major part of the installation in plan view; and FIG. 4 is an enlarged, fragmentary section through the installation taken substantially on the line 4—4 of FIG. 3.

Figure 1:
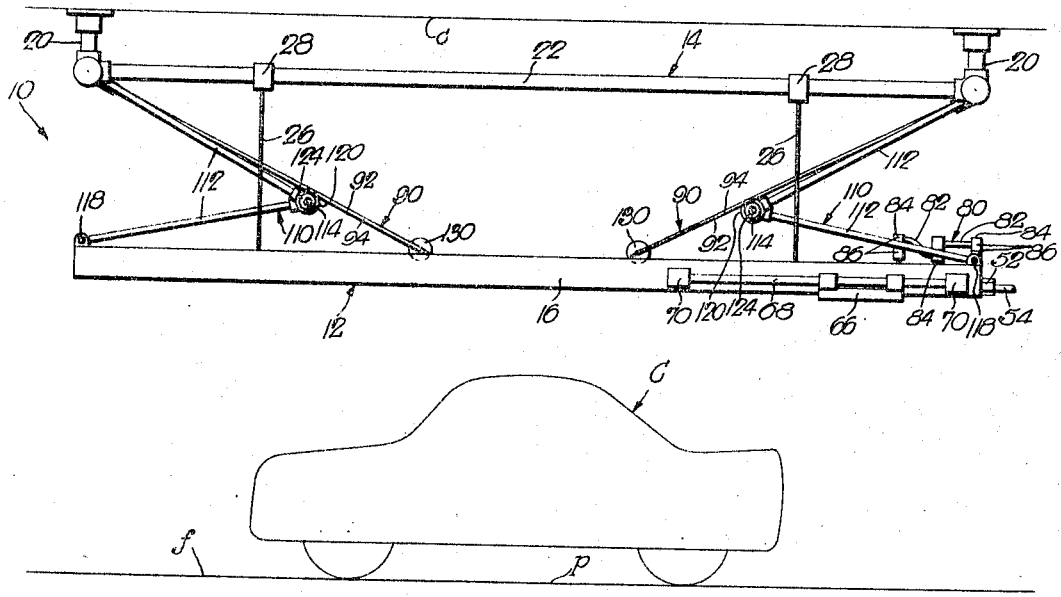
FIG. 1 is a side view of a car wash installation embodying the present invention.
Figure 2:
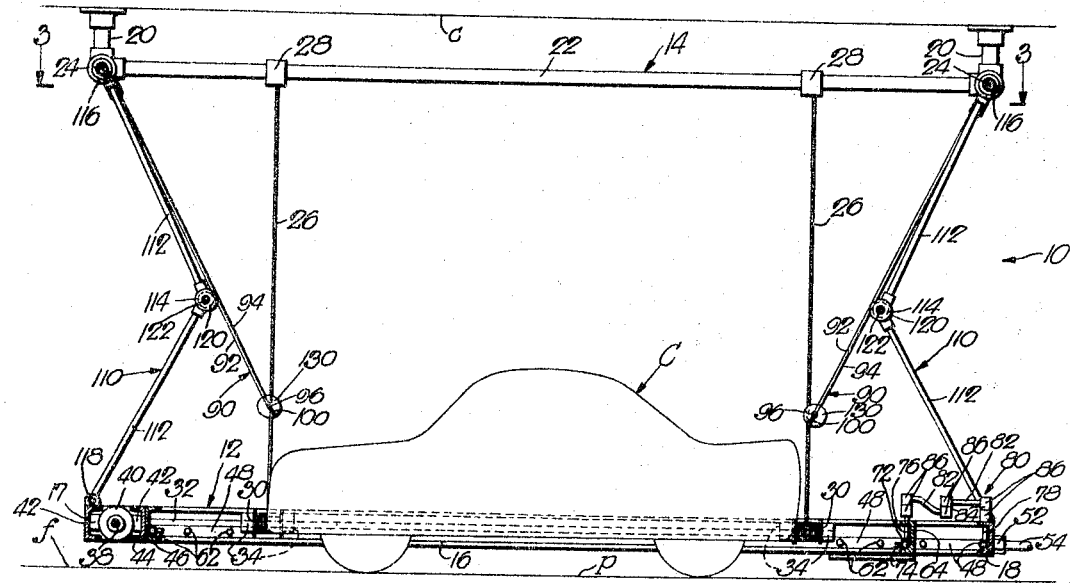
FIG. 2 is a longitudinal section through the same installation in operation.

Referring to the drawings, and more particularly to FIGS. 1 to 3 thereof, the reference numeral 10 designates a car wash installation having a spray frame 12 which is suspended from an overhead support 14 in a car wash-establishment with a floor $f$ and a ceiling $c$. The frame 12 is operationally movable vertically in opposite directions to spray a car C in a wash pit area $p$ on the floor $f$ underneath the frame (FIG. 3). The frame 12, which is disposed horizontally, is in this instance generally rectangular in outline (FIG. 3), having opposite side channels 16 and opposite end channels 17 and 18. The overhead support 14 is in this instance an articulated rectangular frame which at its corners is suspended at 20 from the ceiling $c$, with the frame having opposite side bars 22 and opposite end bars 24. The spray frame 12 is held suspended from the overhead support 14 by cables 26 which with their top and bottom ends are suitably anchored to blocks 28 on the support bars 22 and to reels 30 on the frame 12, respectively, with the cables 26 being wound on the reels 30 and the latter being power-driven in opposite directions for operationally moving the frame 12 up and down. The reels 30 are mounted on shafts 32 which are journalled in bearing blocks 34 on the opposite side channels 16 of the frame 12 and are operatively connected, through bevel gearing in casings 36 on the frame, with a transverse shaft 38 which is driven by a reversible motor 40. The motor 40 is suitably mounted at 42 on the adjacent end channel 17 and a nearby cross-channel 44 of the frame 12. Also provided in the frame 12 back-to-back with the cross-channel 44 is another channel 46 which is an end channel of the frame insofar as the spray area of the latter and the wash pit area $p$ on the floor is concerned. Thus, there is suitably mounted in the frame 12 a rectangular endless conduit 48 which extends uninterruptedly in and along the side and end channels 16, 18 and 46 and has an inlet at 50 which through a union 52 and a flexible hose 54 (FIG. 3) is connected with a liquid supply line 56 having a regulating valve 58 and leading from a pump unit 60 on the floor $f$. The conduit 48 is along the side channels 16 and the cross-channel 46 of the frame 12 provided with a multiplicity of discharge nozzles 62 which are directed inwardly of the frame for spraying the opposite sides and one end of a car in the pit area sideways.

In accordance with one aspect of the present invention, the frame 12 is lengthwise adjustable in its spray area for equally effective spraying of cars of different lengths. To this end, there is provided in the frame another cross-channel 64 which through end straps 66 is guided on bars 68 for adjustability lengthwise of the frame. The bars 68 are mounted in blocks 70 on the outside of the side channels 16 of the frame. Suitably secured in the cross-channel 64 is a conduit 72 which is closed at both ends and provided with a plurality of discharge nozzles 74 that are directed inwardly of the frame 12 toward the opposite cros-channel 46. The conduit 72 is supplied with liquid from the other conduit 48 in the frame. To this end, the conduit 72 and the part of the conduit 48 along the end channel 18 of the frame are provided substantially midway of their lengths with upwardly extending branches 76 and 78 which through a toggle-type conduit connection 80 are in communication with each other. The connection 80 provides two pipes 82 which through suitable unions 84 are connected with each other and with the respective conduit branches 76 and 78, with each union having relatively turnable companion parts 86. Thus, the conduits 48 and 72 are simultaneously supplied with liquid from the pump 60, with ensuing simultaneous discharge of liquid jets or sprays from all nozzles 62 and 74 against the sides and opposite ends of a car in the pit area. Of course, in operational up and down movement of the frame 12 during spraying, the forced liquid jets from the nozzles will reach all exposed surfaces of the car, including the top thereof, although the liquid jets will be most effective on the nearest upright car surfaces on which they impinge with optimum force. The spray frame 12 may undergo a predetermined wash cycle under automatic control or manual control (neither shown). Such a wash cycle may involve, for example, relatively slow lowering of the frame 12 from its uppermost position in FIG. 1 into a lowermost position like or similar to that in FIG. 2 and then return to its uppermost position, followed by two more similar descents and ascents of the frame after suitable intervals, with the frame spraying water, shampoo and water, respectively, on its three successive descents and ascents for flushing all dust and loose dirt from the exemplary car C, subjecting it to the cleansing action of the applied shampoo, and flushing off the applied shampoo and accumulated dirt therein in a final rinse. To this end, the pump unit 60 is adapted selectively to deliver water or shampoo.

The frame 12 may be of a size so that its spray area will accommodate a car of most any large size and even a truck. Thus, the exemplary frame 12 will accommodate a car of maximum size when its adjustable cross-channel 64 with the spray nozzles 74 is shifted back against the end channel 18 of the frame. However, with the exemplary car C being of medium size, the cross-channel 64 is preferably adjusted forwardly as shown in FIGS. 2 and 3, and the car so located lengthwise in the pit area as to be about equally spaced from the spray nozzles 62 and 74 in the cross-channels 46 and 64 for most effective spraying. The present frame 12 will, of course, accommodate and wash with maximum effect even the smallest cars on simply adjusting the cross-channel 64 forwardly still further to the required extent. Keeping in mind that the widths of cars do not vary nearly as widely as their lengths and that for that reason the sprays from the nozzles 62 in the side channels 16 of the frame effectively reach cars of all sizes, the present frame 12 will indeed wash cars of all sizes with equal optimum thoroughness by the simple provision of the adjustable cross-channel 64 with its nozzles 74 and by the simple task of adjusting this cross-channel for best results.

In accordance with another important aspect of the present invention, the effectiveness of the car wash installation is even further increased by providing for spraying a car in the pit area from above in the first place, and in most effective sweep fashion in the second place. To this end, there is pivotally suspended from the overhead support 14 another, auxiliary, spray system which is swingable over a car in the pit area preferably lengthwise thereof. Advantageously, the auxiliary spray system is in the form of two separate spray frames 90 to permit their pivoted overhead support for their most effective sweep of a car thereunderneath, i.e., in swinging motion following as nearly as possible the general contour of by far the greater majority of cars for optimum impingement and flushing effect of the spray on cars. The auxiliary spray frames 90 are in this instance identical, each comprising a U-shaped conduit 92 with opposite legs 94 and a connecting yoke 96, of which the legs 94 are through end bearings 98 pivoted on an end bar 24 of the overhead support 14, while the yoke 96 is provided with a plurality of discharge or spray nozzles 100. One leg 94 of each frame 90 is near its end also provided with a fitting 102 with which is connected a flexible hose 104 for supplying the frame with liquid, with the hose 104 being, in turn, connected with the pump unit 60 through a supply line 106 which branches from the supply line 56 and has a regulating valve 108. It will be seen with reference to FIGS. 1 and 2 that by pivotally supporting the spray frames 90 in the described locations on the overhead support 14, their spray nozzles swing in rough approximation of the front and rear halves, respectively, of the vertical contour of the exemplary car C. Of course, it is fully within the purview of the present invention pivotally to support these spray frames 90 in different locations on the overhead support in which they follow particular car contours even closer.

Provisions are also made whereby the auxiliary spray frames 90 are operationally swung on the power descent and ascent of the main spray frame 12. To this end, there is provided for each auxiliary frame 90 a toggle joint 110 which connects one end of the main frame 12 with the adjacent end of the overhead support 14. Thus, each joint 110 has two spaced sets of toggle arms 112 which at 114 are pivotally connected with each other and at 116 and 118 are pivotally mounted on an end bar 24 of the overhead support 14 and on the end channel 17 or 18 therebeneath of the main spray frame 12, respectively.

The sets of toggle arms of each joint 110 are at their knees 120 preferably cross-braced as at 122 and are there provided with outwardly extending sleeves 124 of rubber or the like on which the associated auxiliary frame 90 rests with its legs 94. Accordingly, on the descent of the main spray frame 12 from its uppermost position in FIG. 1 to its lowermost position in FIG. 2, the auxiliary spray frames 90 will follow the descending knees 120 of the toggle joints 110 and thus swing downwardly. Conversely, on the ascent of the main spray frame 12 from its lowermost position in FIG. 2 to its uppermost position in FIG. 1, the auxiliary spray frames will follow the ascending knees 120 of the toggle joints 110 and thus swing upwardly.

The present car wash installation is particularly effective in the matter of thoroughly washing a car, or for that matter a truck, this by virtue of the provision of the auxiliary spray frames 90 and the adjustability of the effective length of the main spray frame 12, with ensuing fairly uniform and optimum impingement of the spray on all exposed surfaces of a car and considerable and lively cross-streaming of liquid on the car surfaces. Each auxiliary spray frame 90 is preferably also provided with non-scratch padding in the form of spaced collars 130 of rubber or the like with which it comes to rest on a part of a vehicle which it does not clear on its downswing, such as the top of a station-wagon or truck, for example.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a car wash installation having a longitudinal wash pit area on the floor, the combination of a first horizontally disposed, longitudinal frame operatively movable vertically in opposite directions and having conduit means with nozzles for liquid-spraying a car in the pit area sideways; an overhead support; two other frames pivotally mounted on said support about parallel axes extending transversely, and being in vertical downward projection near the opposite ends, respectively, of said first frame for swinging movement in opposite directions past and in rough approximation of the front and rear halves respectively, of the vertical contour of a car in the pit area, each of said other frames having conduit means with nozzles substantially radially of its pivot axis for liquid-spraying a car in the pit area from above; and means for simultaneously supplying said conduit means with liquid; power means for operationally moving said first frame; and an operating connection between said first frame and other frames whereby said other frames are swung upwardly and downwardly on operational upward and downward movements, respectively, of said first frame.

2. In a car wash installation, the combination of a first horizontally-disposed longitudinal frame with opposite sides and ends operationally movable vertically in opposite directions and having conduit means with discharge nozzles directed inwardly of said frame for liquid-spraying a car in a pit area on the floor beneath said frame; power means for operationally moving said frame; a toggle joint with a pair of arms pivotally connected at their knee-forming ends, and pivotally mounted with their other ends on said support and on one frame end, respectively, about first parallel horizontal axes transversely of said frame, with the knee of said joint being within the longitudinal extent of said frame and moving up and down with the latter; and an auxiliary frame pivoted on said support about an axis parallel to said first axes and resting on top of said joint knee for upward and downward swing on up and down movement, respectively, of the latter, with said auxiliary frame having conduit means with substantially radial nozzles for liquid-spraying a car in the pit area from above.

3. The combination in a car wash installation as set forth in claim 2, in which the pivot axis of said auxiliary frame is so located longitudinally of said first frame that said auxiliary frame swings in an arc which roughly approximates substantially one-half the length of the vertical contour of a car in the pit area.

4. The combination in a car wash installation as set forth in claim 2, which further comprises non-scratch padding on said auxiliary frame with which the latter comes to rest on a car in the pit area if not clearing the same on its downward swing.

5. In a car wash installation, the combination of a first horizontally-disposed longitudinal frame with opposite sides and ends operationally movable vertically in opposite directions and having conduit means with discharge nozzles directed inwardly of said frame for liquid-spraying a car in a pit area on the floor beneath said frame; power means for operationally moving said frame; two toggle joints at the opposite ends of said frame, each joint having a pair of arms pivotally connected at their knee-forming ends, and pivotally mounted with their other ends on said support and on a frame end, respectively, about first parallel horizontal axes transversely of said frame, with the knees of said joints being within the longitudinal extent of said frame and moving up and down with the latter; and two auxiliary frames pivoted on said support about spaced axes, respectively, parallel to said first axes and resting on top of the respective joint knees for upward and downward swing on up and down movement, respectively, of the latter, with said auxiliary frames having conduit means with substantially radial nozzles for liquid-spraying a car in the pit area from above.

6. The combination in a car wash installation as set forth in claim 5, in which the pivot axes of said auxiliary frames are so located longitudinally of said first frame that said auxiliary frames swing in arcs which roughly approximate the front and rear halves, respectively, of the vertical contour of a car in the pit area.

7. The combination in a car wash installation as set forth in claim 5, which further comprises non-scratch padding on each auxiliary frame with which the latter comes to rest on a car in the pit area if not clearing the same on its downward swing.

8. In a car wash installation, the combination of an overhead support; a first horizontally disposed, longitudinal frame suspended from said support and operatively movable vertically in opposite directions into up and down positions and having conduit means with nozzles for sideways liquid-spraying a car on the floor beneath said frame;

two other frames pivotally mounted on said support about parallel axes extending transversely, and being in vertical downward projection near the opposite ends, respectively, of said first frame for swinging movement in opposite directions into up and down positions past and in rough approximation of the front and rear halves, respectively, of the vertical contour of a car on the floor beneath said first frame, each of said other frames having conduit means with nozzles substantially radially of its pivot axis for liquid-spraying a car from above; means for simultaneously supplying said conduit means with liquid; and overhead power-operated means for cyclic operation of said frames involving downward and upward swinging movement of said other frames into their down and up positions on downward and upward movement, respectively, of said first frame into its down and up positions, with said frames being in their up positions above a car on the floor beneath said first frame.

References Cited

UNITED STATES PATENTS

| | | | |
|---|---|---|---|
| 1,183,391 | 5/1916 | Mason | 134—123 |
| 2,536,843 | 1/1951 | Dye | 134—123 X |
| 2,583,703 | 1/1952 | Morison. | |
| 2,689,577 | 9/1954 | Dunn et al. | 134—123 |
| 2,708,446 | 5/1955 | Phillips | 134—123 X |
| 3,009,469 | 11/1961 | Cunningham | 134—123 |
| 3,187,359 | 6/1965 | Takeuchi | 134—123 X |
| 3,259,138 | 7/1966 | Heinicke | 134—181 X |

FOREIGN PATENTS

| | | |
|---|---|---|
| 437,672 | 11/1926 | Germany. |
| 817,155 | 7/1959 | Great Britain. |
| 588,952 | 2/1959 | Italy. |

CHARLES A. WILLMUTH, *Primary Examiner.*

R. L. BLEUTGE, *Assistant Examiner.*